US012700206B1

(12) United States Patent
Lu et al.

(10) Patent No.: US 12,700,206 B1
(45) Date of Patent: Aug. 4, 2026

(54) DISPLAY DEVICE AND AUTOMOTIVE APPARATUS

(71) Applicant: AUO Corporation, Hsinchu City (TW)

(72) Inventors: Ying-Ru Lu, Hsinchu City (TW);
Pang-Hsuan Liu, Hsinchu City (TW);
Yu-Tsung Huang, Hsinchu City (TW)

(73) Assignee: AUO Corporation, Hsinchu City (CN)

( * ) Notice: Subject to any disclaimer, the term of this
patent is extended or adjusted under 35
U.S.C. 154(b) by 0 days.

(21) Appl. No.: 19/235,592

(22) Filed: Jun. 12, 2025

(30) Foreign Application Priority Data

Mar. 12, 2025 (TW) ................................. 114109228

(51) Int. Cl.
| | |
|---|---|
| *G06V 10/143* | (2022.01) |
| *B60Q 3/00* | (2017.01) |
| *F21V 8/00* | (2006.01) |
| *G02F 1/13357* | (2006.01) |
| *G06V 10/141* | (2022.01) |
| *G06V 10/145* | (2022.01) |

(52) U.S. Cl.
CPC ............. *G06V 10/143* (2022.01); *B60Q 3/00*
(2013.01); *G02B 6/0055* (2013.01); *G02F*
*1/1336* (2013.01); *G02F 2203/11* (2013.01);
*G06V 10/141* (2022.01); *G06V 10/145*
(2022.01)

(58) Field of Classification Search
CPC ........ G02F 1/133615; G02F 1/133616; G06V
10/10; G06V 10/12; G06V 10/141; G06V
10/143; G06V 10/145
USPC ..... 250/459.1, 503.1, 504 R; 349/61, 62, 63,
349/64, 65; 362/459
See application file for complete search history.

(56) References Cited

U.S. PATENT DOCUMENTS

| | | | |
|---|---|---|---|
| 8,830,208 B2 | 9/2014 | Sohn et al. | |
| 11,474,394 B2 * | 10/2022 | Wei ..................... | G02F 1/13362 |
| 2011/0122075 A1 | 5/2011 | Seo et al. | |
| 2015/0103272 A1 | 4/2015 | Kokusho | |
| 2019/0317323 A1 | 10/2019 | Yamaoka | |
| 2024/0135741 A1 * | 4/2024 | Liu ..................... | G06V 40/1318 |
| 2025/0143145 A1 | 5/2025 | Jung | |

FOREIGN PATENT DOCUMENTS

| | | |
|---|---|---|
| DE | 102014220930 | 4/2015 |
| DE | 102024119700 | 4/2025 |
| WO | 2024061891 | 3/2024 |

* cited by examiner

*Primary Examiner* — Keith G. Delahoussaye
(74) *Attorney, Agent, or Firm* — JCIPRNET

(57) ABSTRACT

A display device including a display panel, a substrate, at
least one illumination light emitter, an illumination light
penetrable module and a first illumination light reflective
layer is provided. The substrate is located on a light-emitting
surface of the display panel. The illumination light emitter is
configured to emit illumination light. The illumination light
penetrable module includes a light guide layer, wherein the
light guide layer is disposed on a plane defined by a first
direction and a second direction. The illumination light may
enter the light guide layer via at least one side of the light
guide layer. The first illumination light reflective layer is
disposed on the light guide layer along a stacking direction
and in a peripheral region of the display device. The illu-
mination light penetrates the light guide layer after being
reflected by the first illumination light reflective layer. An
automotive apparatus is also provided.

18 Claims, 5 Drawing Sheets

DISPLAY DEVICE AND AUTOMOTIVE APPARATUS

CROSS-REFERENCE TO RELATED APPLICATION

This application claims the priority benefit of Taiwan application serial no. 114109228, filed on Mar. 12, 2025. The entirety of the above-mentioned patent application is hereby incorporated by reference herein and made a part of this specification.

BACKGROUND

Technical Field

The disclosure relates to a display device and an automotive apparatus.

Description of Related Art

In current automotive apparatuses capable of infrared sensing, an infrared emitter and an infrared sensor are usually combined into a single infrared sensing module, and the infrared sensing module is disposed on a side opposite to a side of the display device used to be joined to a circuit board. In such a configuration, a peripheral region of the display device becomes wider, resulting in poorer visual performance of the display device.

SUMMARY

The disclosure provides a display device and an automotive apparatus, with good optical performance, and the automotive apparatus may have an infrared sensing function.

According to an embodiment of the disclosure, a display device having a display region and a peripheral region surrounding the display region is provided. The display device includes a display panel, a substrate, at least one illumination light emitter, an illumination light penetrable module, and a first illumination light reflective layer. The illumination light emitter is configured to emit an illumination light. The display panel includes a light-emitting surface. The display panel is adapted to emit a display information from the light-emitting surface. The substrate is located on the light-emitting surface of the display panel. The illumination light penetrable module includes a light guide layer. The light guide layer is disposed on a plane defined by a first direction and a second direction. The illumination light is adapted to enter the light guide layer via at least one side of the light guide layer. The first illumination light reflective layer is disposed on the light guide layer along a stacking direction and disposed in the peripheral region. The illumination light penetrates the light guide layer after being reflected by the first illumination light reflective layer. The display information and the illumination light are both emitted from the substrate of the display device.

According to an embodiment of the disclosure, an automotive apparatus is provided. The automotive apparatus includes the above display device and an optical sensor. The optical sensor is configured to sense the illumination light.

Based on the above, in the display device and the automotive apparatus provided according to the embodiment of the disclosure, the illumination light emitter may be disposed separately from the optical sensor, and the illumination light emitter may guide light using the existing peripheral region of the display device. The illumination light emitter and the optical sensor may be applied to infrared sensing. Good visual performance is also achieved for the display device and the automotive apparatus.

To make the features and advantages of the disclosure more comprehensible, several embodiments accompanied with drawings are described in detail as follows.

DESCRIPTION OF THE EMBODIMENTS

Figure 1:
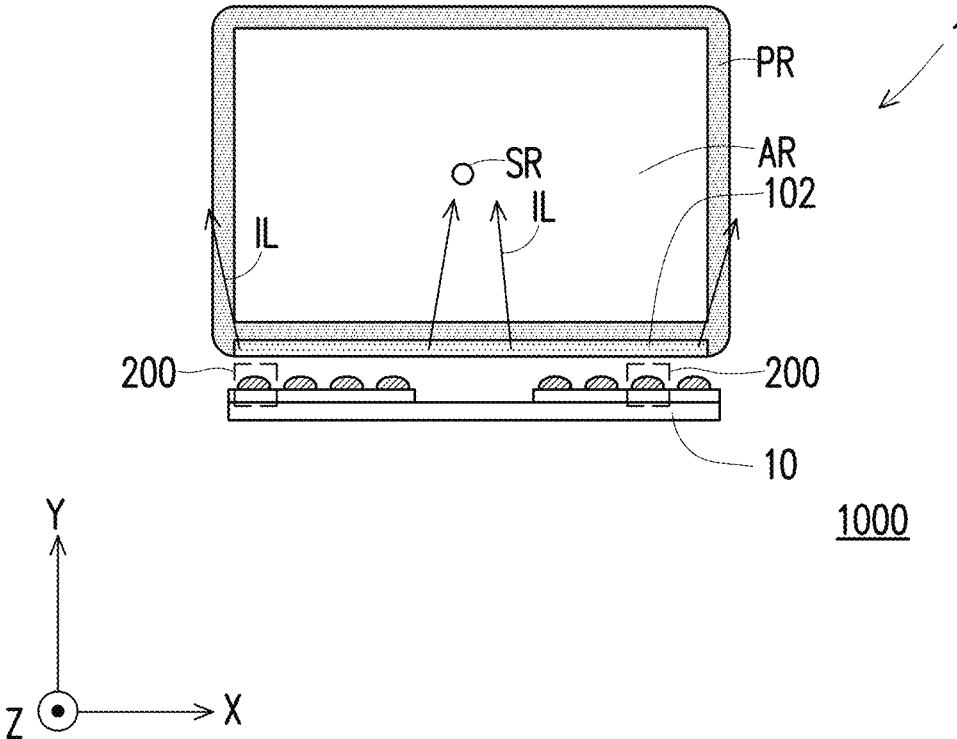
FIG. 1 shows a schematic diagram of an automotive apparatus according to some embodiments of the disclosure.

Referring to FIG. 1, a schematic diagram of an automotive apparatus according to some embodiments of the disclosure is shown. An automotive apparatus 1000 includes a display device 1 and an optical sensor SR.

Figure 2:
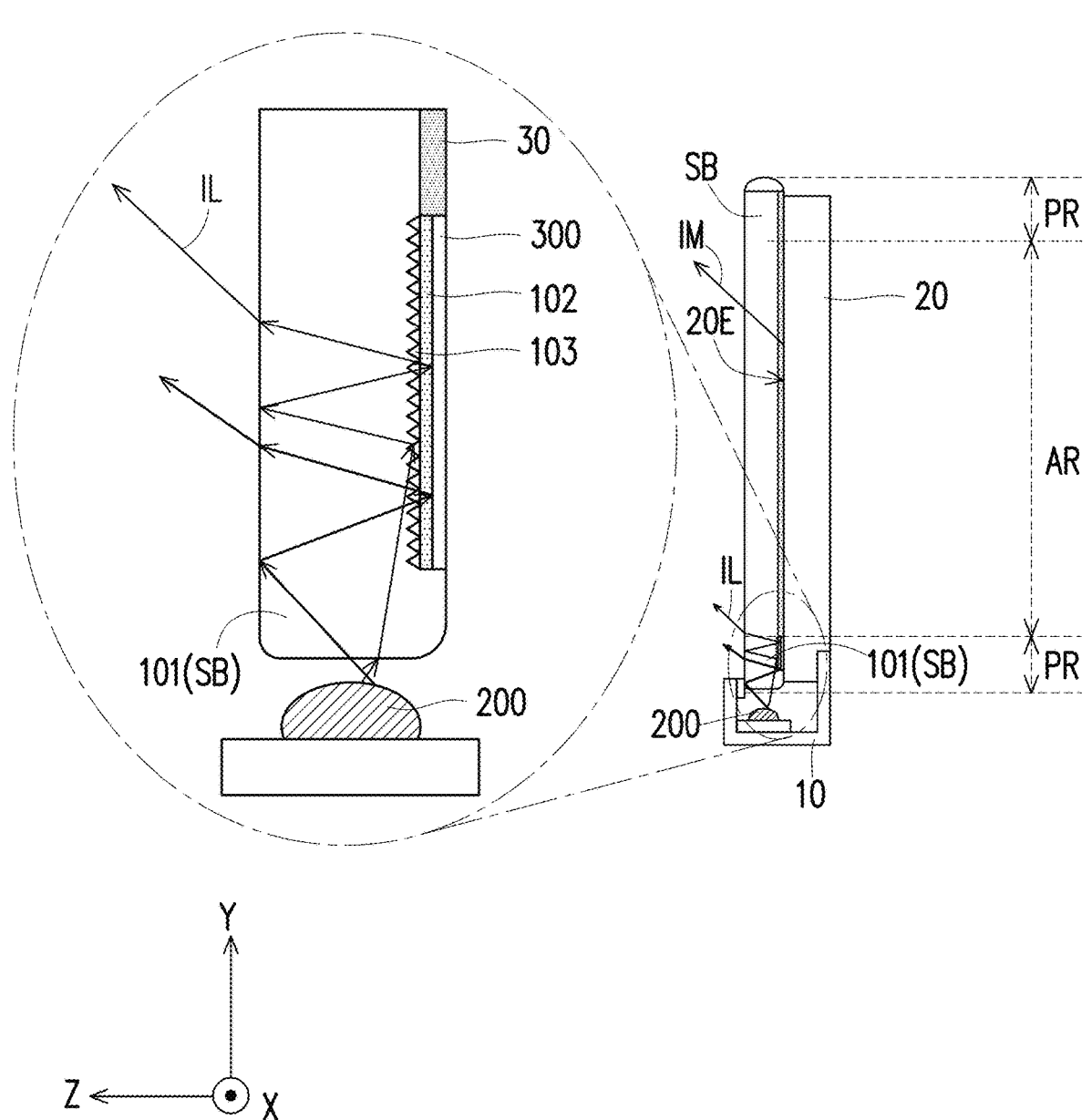
FIG. 2 shows a cross-sectional schematic diagram of the display device in FIG. 1 in a first embodiment of the disclosure.

Referring to FIG. 1 and FIG. 2 at the same time, FIG. 2 shows a cross-sectional schematic diagram of the display device in FIG. 1 in a first embodiment of the disclosure.

In the first embodiment of the disclosure, the display device 1 has a display region AR and a peripheral region PR surrounding the display region AR, and the display device 1 includes a display panel 20, a substrate SB, a plurality of illumination light emitters 200, an illumination light penetrable module 100, and an illumination light reflective layer 300.

The display panel 20 includes a light-emitting surface 20E, and may be, for example, a light-emitting diode display panel, an organic light-emitting diode display panel, a liquid crystal display panel with a backlight module, or the like. Therefore, the display panel 20 may emit a display information IM from the light-emitting surface 20E thereof.

The substrate SB may be, for example, a cover glass of the display device 1, and is located on the light-emitting surface 20E of the display panel 20. Accordingly, the display information IM provided by the display panel 20 may be emitted from the substrate SB of the display device 1, as shown in FIG. 2.

The illumination light emitters 200 may be disposed on a base 10, and the base 10 may be, for example, a frame of the display device 1, but is not limited thereto. Each illumination light emitter 200 may be driven by a circuit board to emit an illumination light IL. The illumination light IL may include, for example, infrared light, but is not limited thereto.

The illumination light penetrable module 100 may at least include a light guide layer 101. In the first embodiment, the light guide layer 101 is a part of the substrate SB. The light guide layer 101 is disposed on a plane defined by an X direction and a Y direction, and the illumination light IL may enter the light guide layer 101 from at least one side of the light guide layer 101, that is, from at least one side of the substrate SB of the display device 1 (i.e., enter the substrate SB), as shown in FIG. 2.

The illumination light reflective layer 300 is disposed in the peripheral region PR and is disposed on the light guide layer 101 along a-Z direction.

As shown in FIG. 2, the illumination light IL emitted from the illumination light emitter 200 enters the light guide layer 101 from one side of the light guide layer 101. At least a part of the illumination light IL can be reflected by the illumination light reflective layer 300, and then penetrates the light guide layer 101 and enters the air (that is, the illumination light IL is emitted from the substrate SB of the display device 1). In a preferable embodiment, the illumination light reflective layer 300 may have a reflectance of more than 90% for the illumination light IL from the illumination light emitter 200, but is not limited thereto.

In some embodiments, the illumination light IL includes infrared light, the illumination light reflective layer 300 is a white paint capable of reflecting infrared rays, and the display device 1 may perform infrared sensing in conjunction with the optical sensor SR capable of detecting infrared rays.

In the structure shown in FIG. 1, the optical sensor SR is disposed in the display region AR of the display device 1. Specifically, the optical sensor SR may be hidden between a pixel array and a backplane of the display device 1. However, the disclosure is not limited thereto. In some embodiments, the optical sensor SR may be disposed in the peripheral region PR of the display device 1, or may be disposed outside the display device 1.

It should be noted that in existing automotive apparatuses capable of infrared sensing, an infrared emitter and an infrared sensor are usually combined into a single infrared sensing module, and the infrared sensing module is disposed on a side opposite to a side of the display device used to be joined to a circuit board. In such a configuration, the infrared sensing module causes a peripheral region of the display device to become wider, reducing visual performance of the display device.

In contrast, in the automotive apparatus 1000 according to some embodiments of the disclosure, the illumination light emitter 200 used to emit infrared light is disposed on a side of the display device 1 to be bonded to a circuit board (for example, a PCB board), and is disposed separately from the optical sensor SR, as shown in FIG. 1. The optical sensor SR may be disposed in the display region AR of the display device 1 by using under-display technology. Therefore, the optical sensor SR does not cause the peripheral region PR of the display device 1 to become wider. More importantly, the illumination light emitter 200 disposed on the same side as the circuit board of the display device 1 can guide light by using the existing peripheral region PR of the display device 1 on that side. Therefore, the peripheral region PR of the display device 1 also does not become wider. Through the above configuration, the visual performance of the automotive apparatus 1000 and the display device 1 is greatly improved.

Referring to FIG. 2, in some embodiments, the illumination light penetrable module 100 may further include a pattern layer 103. The pattern layer 103 is located between the light guide layer 101 and the illumination light reflective layer 300. The pattern layer 103 may include, for example, a plurality of microprism structures, but is not limited thereto. The illumination light IL emitted by the illumination light emitter 200 undergoes diffuse reflection after entering the pattern layer 103. By the above diffuse reflection, a travel path of the illumination light IL can be changed, an amount of light penetrating the light guide layer 101 is increased, and accuracy of infrared sensing is improved.

However, the disclosure is not limited thereto. In some embodiments, a normal of a surface of the illumination light reflective layer 300 may not be parallel to the Z direction, but is inclined toward a corresponding illumination light emitter 200 with respect to the Z direction. In other words, the normal of the surface of the illumination light reflective layer 300 may not be perpendicular to the X direction and the Y direction. Accordingly, an incident angle and a reflection angle of the illumination light IL on the surface can be reduced, so as to increase an amount of light penetrating the light guide layer 101 and improve accuracy of infrared sensing. In the above configuration, the illumination light penetrable module 100 may not include the pattern layer 103.

The illumination light penetrable module 100 may further include an optical layer 102. The optical layer 102 is located between the light guide layer 101 and the illumination light reflective layer 300. The optical layer 102 has a transmittance of more than 90% for the illumination light IL from the illumination light emitter 200. Therefore, most of the illumination light IL can be reflected back by the illumination light reflective layer 300 after penetrating the optical layer 102, and then penetrate the optical layer 102 and the light guide layer 101 to enter the air. In some embodiments, the optical layer 102 may be, for example, an infrared transmittable ink, but is not limited thereto.

In a preferable embodiment, the optical layer 102 may have a transmittance of less than 2% for visible light. In addition, the optical layer 102 and a black ink layer 30 of the display device 1 may be manufactured using a same process program, so that the optical layer 102 and the black ink layer 30 are disposed on a same layer in the Z direction. In such a design, when a user views the display device 1 from outside the display device 1, a consistent color performance can be seen in the peripheral region PR.

In order to fully explain various embodiment aspects of the disclosure, other embodiments of the disclosure are described below. It should be noted that the following embodiments continue to use the reference numerals and part of the content of the above embodiments. The same reference numerals are used to denote the same or similar elements, and the descriptions of the same technical content are omitted. For the omitted parts, reference may be made to the above embodiments, and the following embodiments will not repeat the description.

Figure 3:
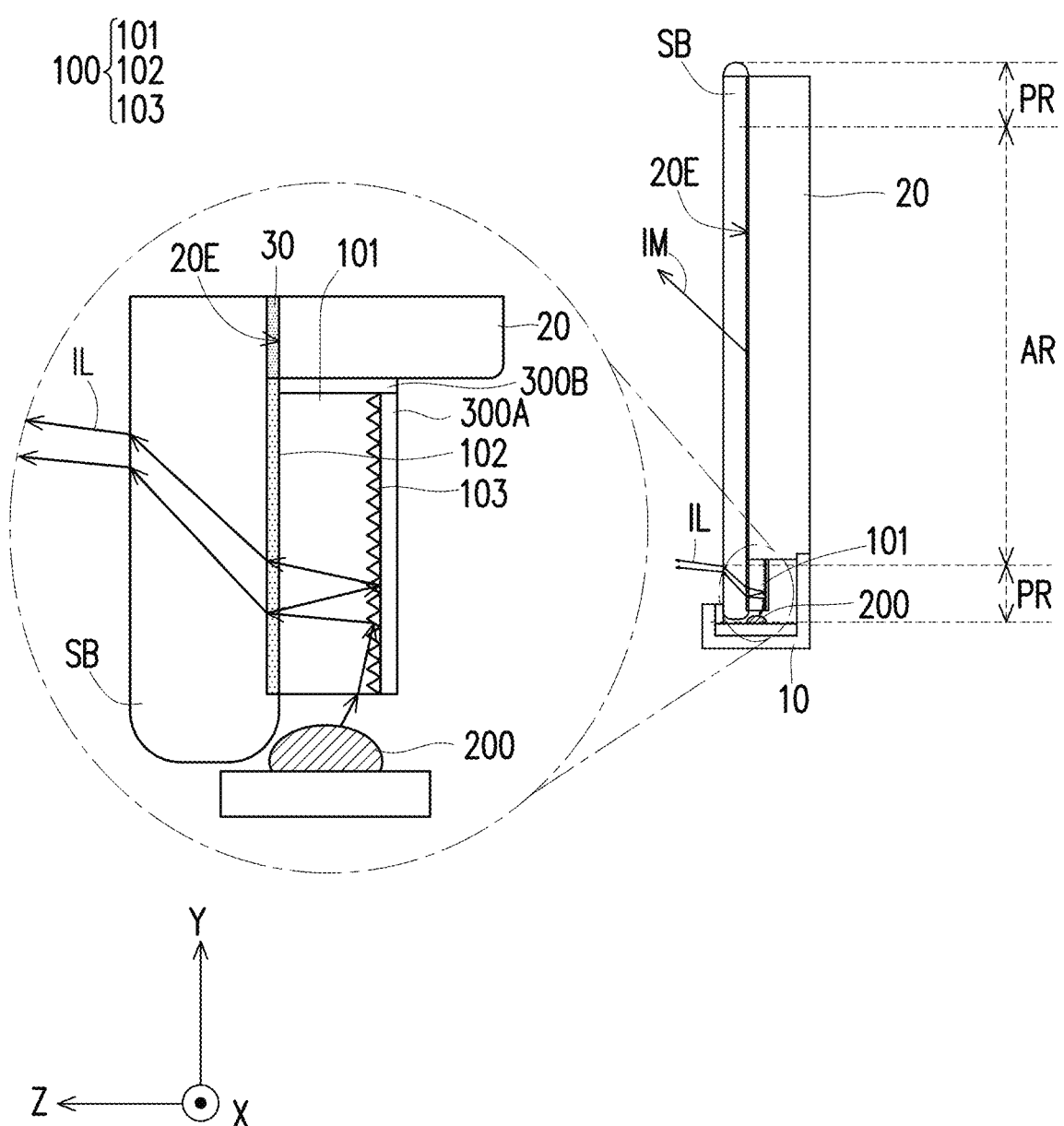
FIG. 3 shows a cross-sectional schematic diagram of the display device in FIG. 1 in a second embodiment of the disclosure.

Referring to FIG. 1 and FIG. 3 at the same time, FIG. 3 shows a cross-sectional schematic diagram of the display device in FIG. 1 in a second embodiment of the disclosure.

In the second embodiment of the disclosure, the display device 1 has a display region AR and a peripheral region PR surrounding the display region AR, and the display device 1 includes a display panel 20, a substrate SB, a plurality of illumination light emitters 200, an illumination light penetrable module 100, and an illumination light reflective layer 300A.

The display panel 20 includes a light-emitting surface 20E, and may be, for example, a light-emitting diode display panel, an organic light-emitting diode display panel, a liquid crystal display panel with a backlight module, or the like. Therefore, the display panel 20 may emit a display information IM from the light-emitting surface 20E thereof.

The substrate SB may be, for example, a cover glass of the display device 1, and is located on the light-emitting surface 20E of the display panel 20. Accordingly, the display information IM provided by the display panel 20 may be emitted from the substrate SB of the display device 1, as shown in FIG. 3.

The illumination light penetrable module 100 may at least include a light guide layer 101. The illumination light IL may penetrate the substrate SB after penetrating the light guide layer 101. The light guide layer 101 is disposed on a plane defined by an X direction and a Y direction, and the illumination light IL may enter the light guide layer 101 from at least one side of the light guide layer 101, as shown in FIG. 3. In some embodiments, the light guide layer 101 may include polycarbonate (PC), polymethyl methacrylate (PMMA), or the like.

The illumination light reflective layer 300A is disposed in the peripheral region PR and is disposed on the light guide layer 101 along a-Z direction.

As shown in FIG. 3, the illumination light IL emitted from the illumination light emitter 200 enters the light guide layer 101 from one side of the light guide layer 101. At least a part of the illumination light IL can be reflected by the illumination light reflective layer 300A, and then penetrates the light guide layer 101 and the substrate SB, and then enters the air (that is, the illumination light IL is emitted from the substrate SB of the display device 1). In a preferable embodiment, the illumination light reflective layer 300A may have a reflectance of more than 90% for the illumination light IL from the illumination light emitter 200, but is not limited thereto.

Referring to FIG. 3, in some embodiments, the illumination light penetrable module 100 may further include a pattern layer 103. The pattern layer 103 is located between the light guide layer 101 and the illumination light reflective layer 300A. The illumination light IL emitted by the illumination light emitter 200 undergoes diffuse reflection after entering the pattern layer 103. By the above diffuse reflection, a travel path of the illumination light IL can be changed, an amount of light penetrating the light guide layer 101 and the substrate SB is increased, and accuracy of infrared sensing is improved.

The illumination light penetrable module 100 may further include an optical layer 102, wherein the light guide layer 101 is located between the optical layer 102 and the illumination light reflective layer 300A. The optical layer 102 has a transmittance of more than 90% for the illumination light IL from the illumination light emitter 200. Therefore, most of the illumination light IL that penetrates the light guide layer 101 can penetrate the optical layer 102 and continue to penetrate the substrate SB and enter the air.

In a preferable embodiment, the optical layer 102 may have a transmittance of less than 2% for visible light. In addition, the optical layer 102 and a black ink layer 30 of the display device 1 may be manufactured using a same process program, so that the optical layer 102 and the black ink layer 30 are disposed on a same layer in the Z direction. In such a design, when a user views the display device 1 from outside the display device 1, a relatively consistent luminance of black can be seen in the peripheral region PR.

In the second embodiment, the display device 1 may further include an illumination light reflective layer 300B, wherein the illumination light reflective layer 300B is located between the light guide layer 101 and the display panel 20. Accordingly, an amount of light penetrating the light guide layer 101 and the substrate SB can be increased, and accuracy of infrared sensing is improved.

Figure 4A:
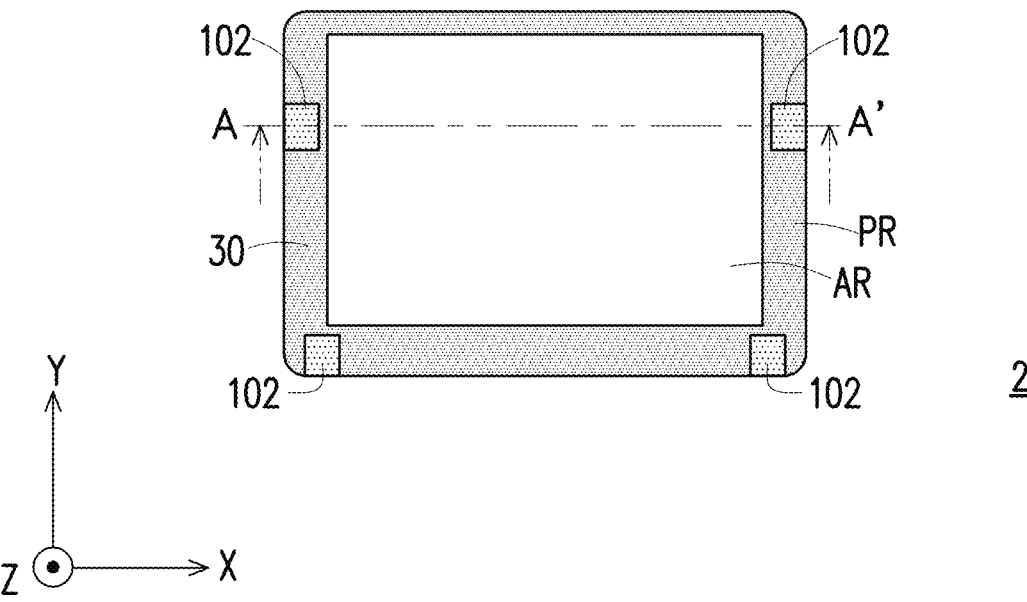
FIG. 4A shows a schematic diagram of a display device according to a third embodiment of the disclosure.
Figure 4B:
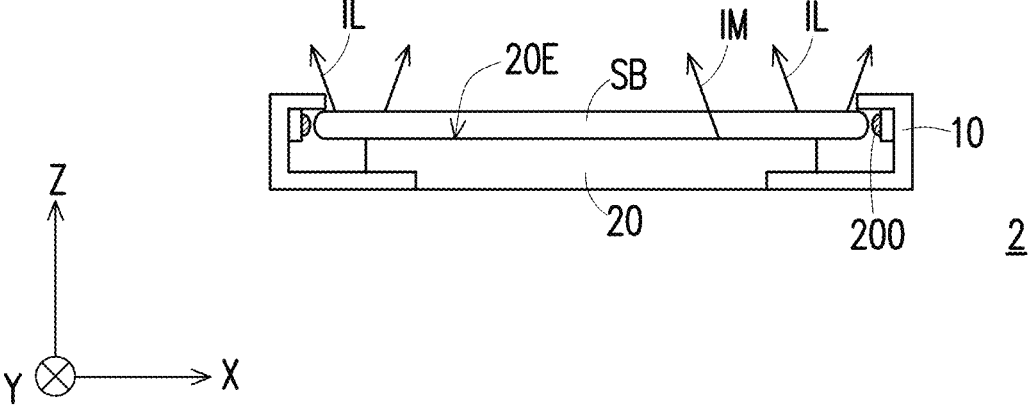
FIG. 4B shows a cross-sectional schematic diagram along line AA' in FIG. 4A.

Referring to FIG. 4A and FIG. 4B, FIG. 4A shows a schematic diagram of a display device according to a third embodiment of the disclosure, and FIG. 4B shows a cross-sectional schematic diagram along line AA' of FIG. 4A. It should be understood that the display device 1 in FIG. 1 may be replaced with a display device 2 of the third embodiment.

As shown in FIG. 4A and FIG. 4B, the display device 2 includes at least four optical layers 102 disposed at different positions in the peripheral region PR. It should be noted that the four different optical layers 102 respectively correspond to different illumination light emitters, light guide layers, and illumination light reflective layers. A configuration between each optical layer 102 and the corresponding illumination light emitter, light guide layer, and illumination light reflective layer may be the same as or similar to the configuration among the optical layer 102, the illumination light emitter 200, the light guide layer 101, and the illumination light reflective layer 300 in the above first embodiment, and thus will not be further described herein.

As shown in FIG. 4A, the plurality of optical layers 102 are disposed in opening portions of the black ink layer 30. Therefore, when a user views the display device 2 from outside, a consistent color performance can be seen in the peripheral region PR. It can be understood that, in the third embodiment, the plurality of illumination light emitters 200 respectively emit illumination light (infrared light) IL toward a plurality of sides of the substrate SB of the display device 2. Accordingly, accuracy of infrared sensing can be improved.

Figure 5:
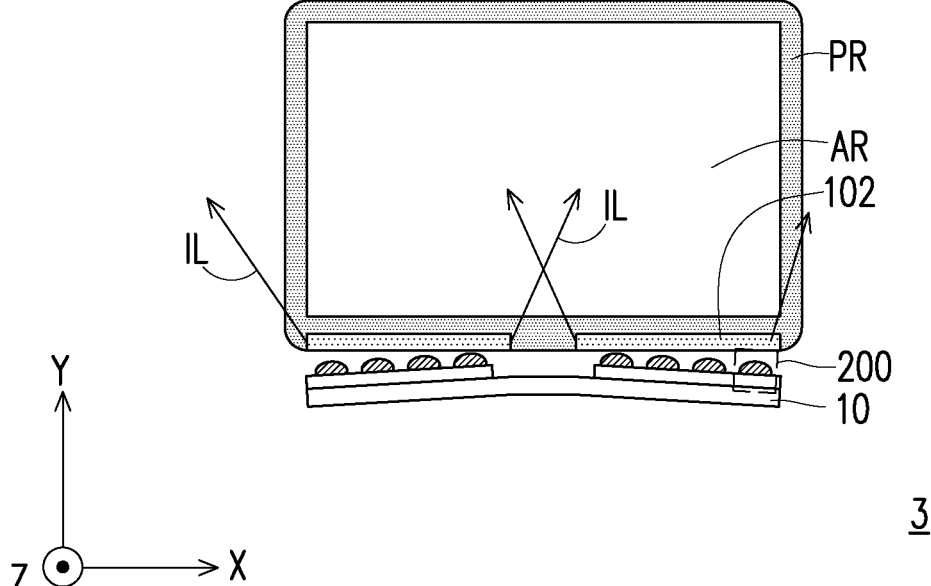
FIG. 5 shows a schematic diagram of a display device according to a fourth embodiment of the disclosure.

Referring to FIG. 5, a schematic diagram of a display device according to a fourth embodiment of the disclosure is shown. It should be understood that the display device 1 in FIG. 1 may be replaced with a display device 3 of the fourth embodiment.

In the fourth embodiment, the display device 3 includes a plurality of illumination light emitters 200, and distances between the illumination light emitters 200 and the corresponding optical layers 102 are different. It should be noted that a configuration between the optical layer 102 and the corresponding light guide layer and illumination light reflective layer may be the same as or similar to the configuration among the optical layer 102, the light guide layer 101, and the illumination light reflective layer 300 in the above first embodiment. Alternatively, the configuration between the optical layer 102 and the corresponding light guide layer and illumination light reflective layer may be the same as or similar to the configuration among the optical layer 102, the light guide layer 101, and the illumination light reflective layers 300A and 300B in the above second embodiment, and thus will not be further described herein. Therefore, it can be understood that in the fourth embodiment, distances between the plurality of illumination light emitters 200 and the corresponding sides of the light guide layers are different. Accordingly, a divergence degree of the illumination light IL (infrared light) after entering the air can be increased, and a sensing range of infrared sensing can be improved.

In summary, in the display device and the automotive apparatus provided according to the embodiments of the disclosure, the illumination light emitter may be disposed separately from the optical sensor, and the illumination light emitter may guide light using an existing peripheral region of the display device. The illumination light emitter and the optical sensor may be applied to infrared sensing. Moreover, good visual performance is achieved for the display device and the automotive apparatus.

What is claimed is:

1. A display device, having a display region and a peripheral region surrounding the display region, the display device comprising:

a display panel, comprising a light-emitting surface, wherein the display panel is adapted to emit a display information from the light-emitting surface;

a substrate, located on the light-emitting surface of the display panel;

at least one illumination light emitter, configured to emit an illumination light;

an illumination light penetrable module, comprising a light guide layer, wherein the light guide layer is disposed on a plane defined by a first direction and a second direction, and the illumination light is adapted to enter the light guide layer via at least one side of the light guide layer; and a first illumination light reflective layer, disposed on the light guide layer along a stacking direction and disposed in the peripheral region, wherein the illumination light penetrates the light guide layer after being reflected by the first illumination light reflective layer, wherein the display information and the illumination light are both emitted from the substrate of the display device.

2. The display device according to claim 1, wherein the light guide layer is a part of the substrate.

3. The display device according to claim 2, wherein the at least one illumination light emitter comprises a plurality of illumination light emitters, the at least one side comprises a plurality of sides, the substrate has the plurality of sides, and the plurality of illumination light emitters respectively emit the illumination light toward the plurality of sides of the substrate.

4. The display device according to claim 1, wherein the illumination light penetrable module further comprises an optical layer, located between the light guide layer and the first illumination light reflective layer, wherein the optical layer has a transmittance of more than 90% for the illumination light.

5. The display device according to claim 4, wherein the optical layer is disposed on a same layer as a black ink layer of the display device in the stacking direction.

6. The display device according to claim 1, wherein the illumination light penetrates the substrate after penetrating the light guide layer.

7. The display device according to claim 1, wherein the illumination light penetrable module further comprises an optical layer, the light guide layer is located between the optical layer and the first illumination light reflective layer, and the optical layer has a transmittance of more than 90% for the illumination light.

8. The display device according to claim 7, wherein the optical layer is disposed on a same layer as a black ink layer of the display device in the stacking direction.

9. The display device according to claim 4, wherein the optical layer has a transmittance of less than 2% for a visible light.

10. The display device according to claim 7, wherein the optical layer has a transmittance of less than 2% for a visible light.

11. The display device according to claim 1, further comprising a second illumination light reflective layer, wherein the second illumination light reflective layer is located between the light guide layer and the display panel.

12. The display device according to claim 1, wherein the illumination light penetrable module further comprises a pattern layer, located between the light guide layer and the first illumination light reflective layer.

13. The display device according to claim 1, wherein the first illumination light reflective layer has a reflectance of more than 90% for the illumination light.

14. The display device according to claim 1, wherein the at least one illumination light emitter comprises a plurality of illumination light emitters, and the plurality of illumination light emitters have a different distance from the at least one side of the light guide layer.

15. The display device according to claim 1, wherein the at least one illumination light emitter is disposed on a side of the display device, and the side of the display device is configured to be bonded to a circuit board.

16. The display device according to claim 1, wherein a normal of a surface of the first illumination light reflective layer is not perpendicular to the first direction and the second direction.

17. An automotive apparatus, comprising:

a display device, having a display region and a peripheral region surrounding the display region, the display device comprising:

a display panel, comprising a light-emitting surface, wherein the display panel is adapted to emit a display information from the light-emitting surface;

a substrate, located on the light-emitting surface of the display panel;

at least one illumination light emitter, configured to emit an illumination light;

an illumination light penetrable module, comprising a light guide layer, wherein the light guide layer is disposed on a plane defined by a first direction and a second direction, and the illumination light is adapted to enter the light guide layer via at least one side of the light guide layer; and a first illumination light reflective layer, disposed on the light guide layer along a stacking direction and disposed in the peripheral region, wherein the illumination light penetrates the light guide layer after being reflected by the first illumination light reflective layer, wherein the display information and the illumination light are both emitted from the substrate of the display device; and an optical sensor, configured to sense the illumination light.

18. The automotive apparatus according to claim 17, wherein the optical sensor is disposed in the display region of the display device.

* * * * *